United States Patent
Ananthakrishnan et al.

(10) Patent No.: US 8,670,456 B2
(45) Date of Patent: *Mar. 11, 2014

(54) METHOD AND SYSTEM FOR TRANSPARENTLY TRANSCODING A MULTICAST STREAM

(75) Inventors: Hariharan Ananthakrishnan, Tamil Nadu (IN); Kumar Thiagarajan, Tamil Nadu (IN); Mahesh Vittal, Tamil Nadu (IN); Srinivasan Santhanam, Tamil Nadu (IN); Suresh Pachiappan, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 13/204,090

(22) Filed: Aug. 5, 2011

(65) Prior Publication Data

US 2011/0286454 A1 Nov. 24, 2011

Related U.S. Application Data

(63) Continuation of application No. 11/232,721, filed on Sep. 21, 2005, now Pat. No. 8,000,339.

(51) Int. Cl.
*H04J 3/26* (2006.01)
(52) U.S. Cl.
USPC .......... 370/432; 370/468; 370/469; 709/247

(58) Field of Classification Search
USPC ............. 370/395.21, 432, 468; 709/247
See application file for complete search history.

(56) References Cited

U.S. PATENT DOCUMENTS

| 5,668,918 | A | 9/1997 | Augenbraun et al. | |
|---|---|---|---|---|
| 6,331,983 | B1 | 12/2001 | Haggerty et al. | |
| 6,359,902 | B1 | 3/2002 | Putzolu | |
| 6,895,216 | B2 | 5/2005 | Sato et al. | |
| 2002/0002708 | A1* | 1/2002 | Arye | 725/95 |
| 2003/0231629 | A1* | 12/2003 | Banerjee et al. | 370/390 |
| 2005/0169310 | A1* | 8/2005 | Knapp et al. | 370/470 |
| 2006/0080407 | A1* | 4/2006 | Rengaraju | 709/219 |
| 2011/0261689 | A1* | 10/2011 | Godas et al. | 370/230 |

* cited by examiner

*Primary Examiner* — Yemane Mesfin
*Assistant Examiner* — Wanda Z Russell
(74) *Attorney, Agent, or Firm* — Fish & Richardson P.C.

(57) ABSTRACT

A method and apparatus for transparently transforming a multicast stream is provided. The method includes transforming the multicast stream in a content engine. The multicast stream has a first bandwidth. The content engine receives a request for the multicast stream from a multicast receiver with a second bandwidth availability. Thereafter, the content engine transforms the multicast stream to a multicast stream with a third bandwidth. The third bandwidth is less than or equal to the second bandwidth. The transformed multicast stream is sent to the multicast receiver.

21 Claims, 3 Drawing Sheets

METHOD AND SYSTEM FOR TRANSPARENTLY TRANSCODING A MULTICAST STREAM

CROSS-REFERENCE TO RELATED APPLICATIONS

This application is a continuation application of and claims priority to U.S. application Ser. No. 11/232,721, filed on Sep. 21, 2005, the entire contents of which are incorporated herein by reference.

BACKGROUND OF THE INVENTION

1. Field of Invention

Embodiments of the invention relate in general to multicasts. More specifically, the embodiments of the invention relate to multicast streaming in heterogeneous networks.

2. Description of the Background Art

Multiparty communication involves transmission of data to multiple receivers, which are connected to each other over a network. The network includes a source host that sends data packets to the multiple receivers identified by a single address. The technique for transferring data to multiple receivers simultaneously, by using the single address, is known as a multicast. A multicast can be used for streaming multimedia content to multicast receivers. For example, the multicast can be utilized in distant e-learning programs in which a video file is played at the source host and is viewed simultaneously by the multiple receivers that have made a request for it. Moreover, the multiple receivers can form a group known as a multicast group. The multicast group can have receivers with different available bandwidth to send and receive data. The multicast used for transmission of data to multiple receivers with different bandwidth availability is known as a heterogeneous multicast. However, in the heterogeneous multicast, the transmission rate of multimedia content is fixed, based on the lowest bandwidth available among the receivers in the multicast group. Many receivers with large bandwidth are not able to avail of good quality viewing or listening to multimedia stream, in spite of having sufficient bandwidth.

According to a conventional technique, layered encoding of multicast streams is used for better utilization of bandwidth in a heterogeneous multicast. In this technique, the receivers with low bandwidth receive fewer layers of encoded multicast stream. Fewer layers result in low quality of the multicast stream. In addition, clients at the receiving end of the multicast stream should be compatible, to decode the layered encoded data for streaming the multicast stream.

In another conventional technique, a video gateway is used, which can reformat the incoming multicast stream, based on varying bandwidth availability in the heterogeneous multicast. The multicast stream is divided into multiple sessions with different bandwidth requirements. The multiple sessions are connected into a single multicast stream by manipulating the data of the multicast stream in a session-transparent fashion.

DETAILED DESCRIPTION OF EMBODIMENTS OF THE INVENTION

The embodiments of the invention provide a method, a system, and a computer-readable medium for transforming a multicast stream. The various embodiments of the invention provide a method for transparently transforming the multicast stream by means of a content engine in a heterogeneous multicast network. The heterogeneous multicast network includes a plurality of multicast receivers, which have non-uniform bandwidth availability. According to various embodiments of the invention, the content engine has the ability to transparently transcode a multimedia stream on receiving requests from a low bandwidth multimedia host player. Moreover, the content engine can use the transcoded multimedia stream to respond to future requests for the same multimedia program. For the purpose of illustration, the request for receiving the multicast stream is referred to as a streaming request.

Figure 1:
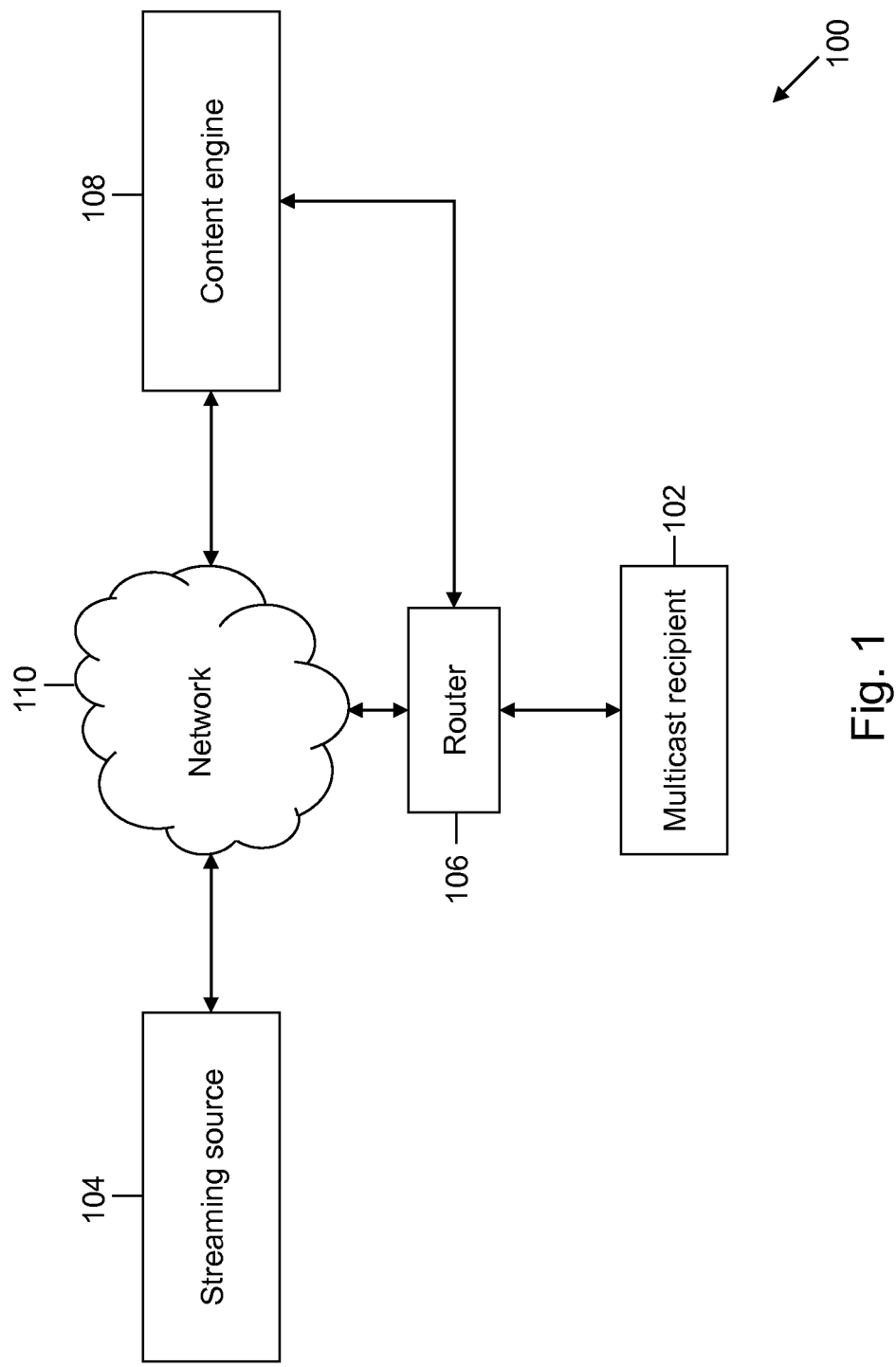
FIG. 1 illustrates a network environment wherein an exemplary embodiment of the invention can be practiced.

FIG. 1 illustrates a network environment 100 wherein an exemplary embodiment of the invention can be practiced. Network environment 100 includes a multicast receiver 102, a streaming source 104, a router 106, and a content engine 108. Further, streaming source 104 and content engine 108 are connected over a network 110. Router 106 acts as a gateway for multicast receiver 104 to network 110. A user present at multicast receiver 102 sends a streaming request for data to streaming source 104. In one embodiment, multicast receiver 102 is one of a plurality of multicast receivers that form a multicast group. In the multicast group, each of the plurality of multicast receivers is identified by a single destination address. Multicast receiver 102 can be a computing device that is capable of processing the information received in the multicast. For example, multicast receiver 102 can be a computer that supports a multimedia player, to play a multimedia multicast. In another embodiment, multicast receiver 102 can be a laptop, a work station, a personal digital assistant (PDA), a portable music player, and the like. According to the various embodiments, the multicast group can include streaming source 104, which can be a data-processing unit. For example, streaming source 104 can be a server that transmits data stored in it. The data can be an audio file, a video file, and the like.

According to various embodiments of the invention, the transmission of data includes sending a multicast stream from streaming source 104 to multicast receiver 102. The multicast stream has a first bandwidth. For example, the multicast stream can be a video stream that requires a high bandwidth, such as 6 Mega bits per second (Mbps) for video streaming. The multicast stream transmits the data over network 110. Examples of network 110 include, but are not limited to, a wired network, a wireless network, a packet switched network, or other networks with unpredictable operational characteristics.

According to various embodiments of the invention, multicast receiver 102 has a second bandwidth availability. The second bandwidth is less than the first bandwidth. For example, multicast receiver 102 can be a home computer using a dial-up connection with low bandwidth availability of 28 kilo bits per second (kbps) to 56 kbps, which makes a request for a video stream with a high bandwidth, such as 6 Mbps. Further, router 106 intercepts the streaming request from multicast receiver 102. An example of router 106 can be a Web Cache Communication Protocol (WCCP) router version 2 by Cisco. A WCCP router can establish and maintain transparent redirection of the streaming request. The redirection is transparent since multicast receiver 102 is unaware of the redirection of the streaming request. Router 106 determines a next network node to which the streaming request can be redirected. In one embodiment, router 106 redirects the streaming request transparently, from multicast receiver 102 to content engine 108. For example, router 106 intercepts the streaming request from multicast receiver 102, which has low bandwidth availability, and routes it to content engine 108. According to various embodiments of the invention, content engine 108 can be a content delivery device that can offer content-based services such as content caching, content hosting, content transcoding, content replication, and the like. According to various embodiments of the invention, content engine 108 can be deployed at a gateway point between the low-bandwidth network and the high-bandwidth network. Content engine 108 joins the multicast group and retrieves the multicast stream requested by multicast receiver 102. The multicast stream is retrieved from streaming source 104. Once the multicast stream is retrieved, content engine 108 transforms the retrieved multicast stream. For example, content engine 108 can transform a stream of multimedia from a high-bandwidth stream to a lower bandwidth stream. Thereafter, content engine 108 sends the transformed multicast stream to multicast receiver 102.

Figure 2:
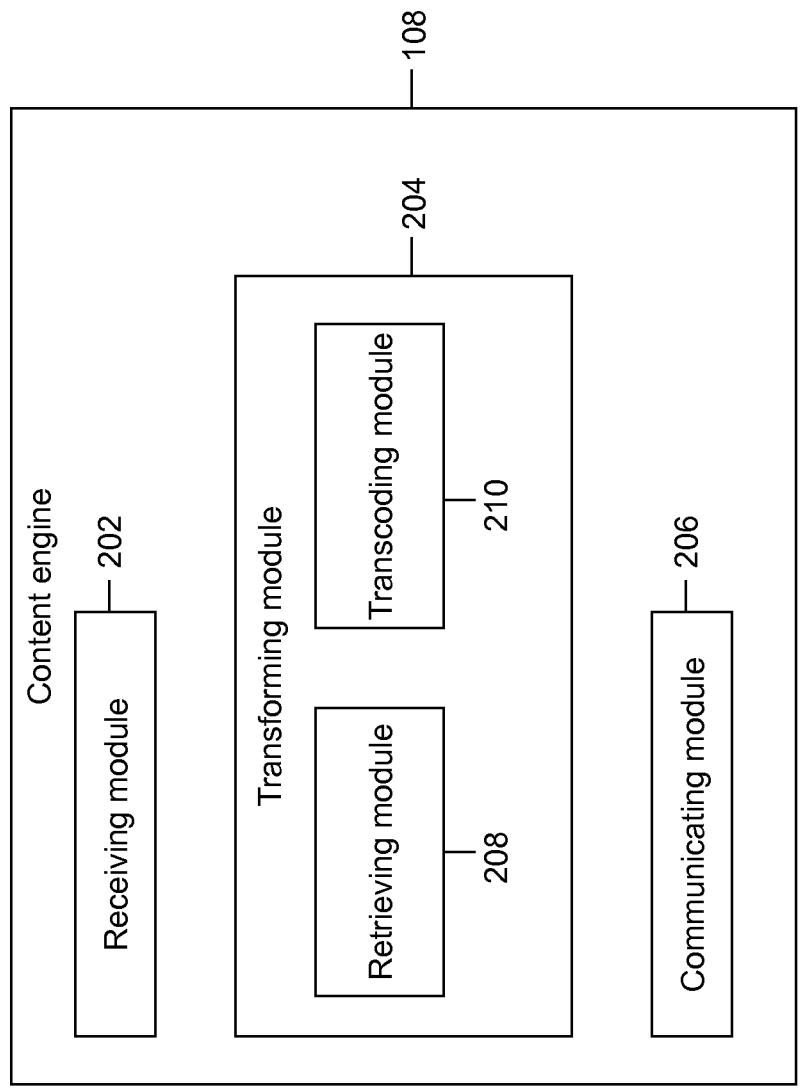
FIG. 2 illustrates a content engine, in accordance with an exemplary embodiment of the invention.

FIG. 2 illustrates content engine 108, in accordance with an exemplary embodiment of the invention. According to various embodiments of the invention, content engine 108 includes a receiving module 202, a transforming module 204, and a communicating module 206.

According to various embodiments of the invention, content engine 108 is deployed for transforming the multicast stream retrieved from streaming source 104. In an embodiment of the invention, content engine 108 includes receiving module 202 for receiving the streaming request routed by router 106. In one embodiment, receiving module 202 can be a receiver that receives the data packets sent by multicast receiver 102. Further, content engine 108 transforms the multicast stream. In an embodiment of the invention, transforming module 204 in content engine 108 transforms the multicast stream.

Transforming module 204 retrieves the multicast stream from streaming source 104, to transform it. In one embodiment of the invention, transforming module 204 includes a retrieving module 208 for retrieving the multicast stream from streaming source 104. Retrieving module 208 sends a retrieving request for the multicast stream to streaming source 104. For example, retrieving module 208 can be a transceiver that is capable of sending and receiving data packets. Content engine 108 transforms the retrieved multicast stream with the first bandwidth to a multicast stream with a third bandwidth. According to various embodiments of the invention, the third bandwidth is less than the second bandwidth. In another embodiment, content engine 108 transforms the multicast stream to the multicast stream with the second bandwidth.

In an embodiment, transforming module 204 includes transcoding module 210 for transcoding the multicast stream. Transcoding module 210 transcodes the multicast stream, based on a configured bandwidth value stored in content engine 108. In one embodiment, the configured bandwidth value is configured by an administrator at content engine 108. In an embodiment, the configured bandwidth value can be a value between the first bandwidth and the second bandwidth. Further, content engine 108 can reduce the bit rate of the multicast stream. In another embodiment, transcoding module 210 modifies the content of the multicast stream. Once transcoding module 210 transcodes the multicast stream, it is sent to multicast receiver 102.

In one embodiment, content engine 108 includes communicating module 206, for sending the transformed multicast stream. Communicating module 206 can be a transmitter in a computer that can send the data packets. Furthermore, communicating module 206 can change the Internet protocol (IP) address in the transformed multicast stream. The changed IP address can be selected from a range of unused IP addresses, which can be provided by the administrator at content engine 108. Thereafter, communicating module 206 sends the transformed multicast stream to multicast receiver 102.

Figure 3:
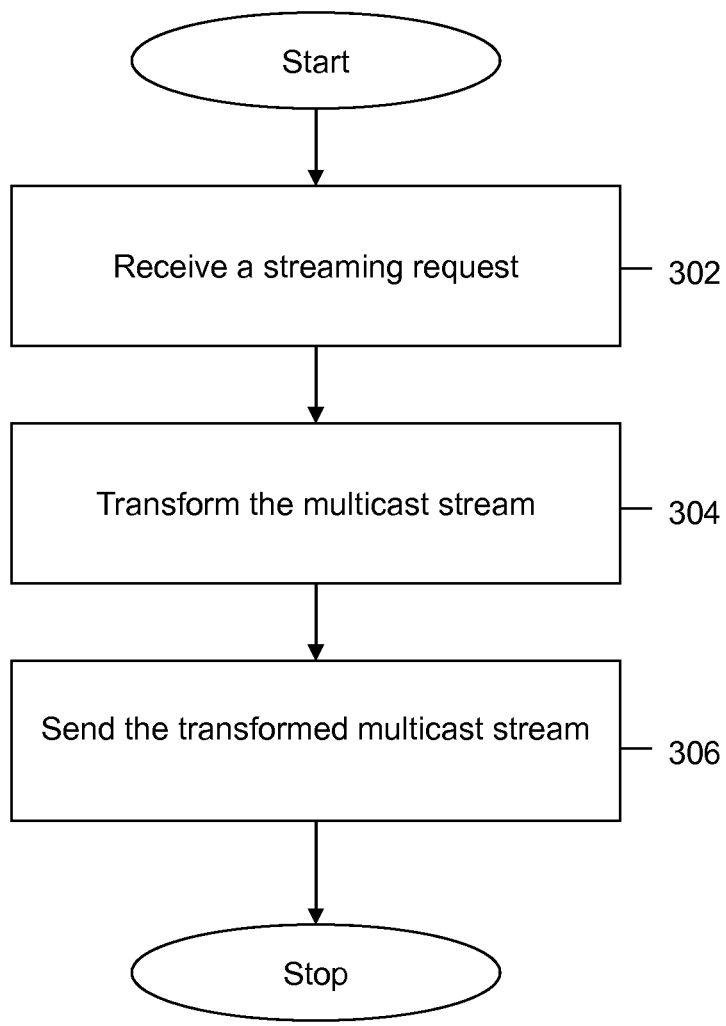
FIG. 3 is a flowchart depicting the requisite steps taken for establishing a multicast stream, in accordance with an exemplary embodiment of the invention.

FIG. 3 is a flowchart depicting the requisite steps taken to establish the multicast stream, in accordance with an exemplary embodiment of the invention. At step 302, content engine 108 receives the streaming request from multicast receiver 102. In one embodiment, receiving module 202 receives the streaming request, which is sent by multicast receiver 102 for data at streaming source 104. In one embodiment, streaming source 104 can be the server that sends the data stored in it. The data can be an audio data, a video data, or a combination thereof. The multicast stream ensures that continuous transmission of data takes place in the form of transmission of data packets. Moreover, the content of the multicast stream is described by a set of description parameters. In one embodiment, the set of description parameters can include Session Description Parameters (SDP) that describes the content of the multicast stream. Multicast receiver 102 can access the information in the SDP for the multicast stream. In one embodiment, a Uniform Resource Locator (URL), indicating the location of the SDP, is published on a website. Multicast receiver 102 can visit the website to access the URL. In an alternative embodiment, the URL can be e-mailed to multicast receiver 102. The SDP for the multicast stream is accessed by multicast receiver 102 by sending the streaming request at the URL. In one embodiment, multicast receiver 102 can send a Hyper Text Transfer Protocol (HTTP) request for the multicast stream. In one embodiment, router 106 intercepts the streaming request from multicast receiver 102, and then routes the streaming request to content engine 108. An example of router 106 can be the WCCP router that can establish and maintain transparent redirection of the streaming request. Thereafter, content engine 108 receives the streaming request routed by router 106. Once the streaming request is received by content engine 108, it can transform the multicast stream.

At step 304, content engine 108 transforms the multicast stream retrieved from streaming source 104. According to various embodiments of the invention, content engine 108 retrieves the multicast stream to transform it. In one embodiment, retrieving module 208 sends the retrieving request to retrieve the multicast stream to streaming source 104. Thereafter, streaming source 104 sends the multicast stream to content engine 108. In one embodiment, streaming source 104 can send the SDP for the multicast stream to content engine 108, which checks the bandwidth of the multicast stream in the received SDP of the multicast stream. In one embodiment, the SDP of the multicast stream includes a bandwidth attribute that indicates the bandwidth requirement for communicating with the multicast stream. For example, SDP includes the bandwidth attribute 'b=AS:mmm' that indicates the bandwidth requirement in kilo bits per second (kbps) of the multicast stream. In the example of a bandwidth attribute, 'nnn' is the first bandwidth in kbps.

According to various embodiments of the invention, content engine 108 transforms the multicast stream, based on the configured bandwidth value stored in content engine 108. In one embodiment, the administrator of content engine 108 configures this bandwidth value. In an embodiment, the administrator of content engine 108 can configure a maximum outgoing stream bandwidth value in content engine 108. Thereafter, content engine 108 transforms the multicast stream based on the maximum outgoing stream bandwidth value. According to various embodiments of the invention, the multicast stream is transformed so that the transformed multicast stream does not have a bandwidth greater than the maximum outgoing stream bandwidth value. The transforming of the multicast stream is transparent since multicast receiver 102 is unaware of transforming of the multicast stream at content engine 108. Transformation of the multicast stream can involve transcoding the multicast stream with high bandwidth to a multicast stream with lower bandwidth.

According to various embodiments of the invention, content engine 108 transforms the multicast stream based on a target bit rate of the multicast stream. In one embodiment, content engine 108 decides the target bit rate of the transformed multicast stream, based on the maximum outgoing stream bandwidth value, which is stored in content engine 108. The target bit rate is the bit rate at which the transformed multicast stream is sent to multicast receiver 102 by content engine 108. The target bit rate is less than the bit rate of the multicast stream. The bit rate of the multicast stream is the rate at which the data of the multicast stream is sent by streaming source 104. Content engine 108 changes the bit rate of the multicast stream to the target bit rate of the transformed multicast stream. For example, content engine 108 can transform a video stream with a bit rate of 3 Mbps to a video stream with a target bit rate of 1 Mbps by reducing quality of the video stream. In another embodiment, transcoding module 210 in content engine 108, transcodes the multicast stream by modifying the content of the multicast stream. According to various embodiments of the invention, modification of the content of the multicast stream is based on a format of the multicast stream, which is retrieved by content engine 108. For example, transcoding module 210 can transcode a video stream with a Moving Picture Experts Group 1 (MPEG-1) format to a video stream with H.261 format. The video stream with H.261 format is a lower quality video stream and requires lower bit rate than MPEG-1 format. Further, trancoding of the multicast stream involves modifying the set of description parameters of the content of the multicast stream. In an embodiment, the SDP for the multicast stream is rewritten, to include the modified information. An example of the attributes that are modified in the SDP for the multicast stream is given below:

m=video/audio<transport port>RTP/AVP<new transcoded format>
a=rtpmap
a=fmtp
c=IN IP 4<Changed IP address>
b=AS:nnn In the attributes that are modified in the multicast stream given above, 'm' is a media attribute that describes the media type of the multicast stream. The media type can be video or audio. The media attribute can also indicate the transport port to which the SDP is sent and the protocol used to transport the multicast stream. The new transcoded format describes the format of the transcoded multicast stream. Further, 'a' is a media-specific attribute of the SDP of the multicast stream. In the example of attributes, given above, 'a=rtpmap' is the media-specific attribute that indicates a payload type used in the SDP for the multicast stream. Moreover, 'a=fmtp' is a format-specific media attribute used for encoding and decoding the multicast stream. The 'c' field in the example of attributes given above contains the connection data information. The 'c=IN IP4<changed IP address>' indicates that the Internet (IN) is the network type used for transmission of the multicast stream, and 'IP4' used in the 'c' attribute describes the address type. However, the third subfield in the 'c' attribute describes the changed IP address to which the multicast stream is directed. Moreover, 'b=nnn' indicates the attribute describing the bandwidth of the multicast stream. According to various embodiments of the invention, the other attributes of the SDP of the multicast stream can also be modified to support encoding formats.

In an embodiment, transcoding module 210 can reduce the frame per second (FPS) rate of the multicast stream. In another embodiment, transcoding module 210 can also reduce the resolution of the multicast stream. For example, transcoding module 210 can reduce the video resolution if the multicast stream is a video stream.

At step 306, content engine 108 sends the transformed multicast stream to multicast receiver 102. In one embodiment, communicating module 208 sends the transformed multicast stream to multicast receiver 102. According to various embodiments of the invention, communicating module 208 sends the transformed multicast stream to a new multicast group with a changed IP address. The new multicast group is a multicast group of which multicast receiver 102 becomes a member. According to various embodiments of the invention, the new multicast group has an IP address that is different from the earlier IP address of the multicast group of multicast receiver 102. In an embodiment of the invention, content engine 108 modifies the IP address in the SDP of the transformed multicast stream to the IP address of a new multicast group. Multicast receiver 102 becomes a member of the new multicast group and receives the transformed multicast stream. In one embodiment of the invention, the administrator of content engine 108 specifies a range of unused IP addresses that can be used to send the transformed multicast stream. The new IP address is selected from the range of unused IP addresses. According to various embodiments of the invention, content engine 108 selects the new IP address from the range of unused IP addresses to send the transformed multicast stream. Moreover, content engine 108 ensures that once the content of the multicast stream is transformed, it is reused each time a new streaming request for the multicast stream is received from at least one of the plurality of multicast receivers with bandwidth availability of less than the first bandwidth. For example, the modified SDP can be reused for the new streaming requests sent by at least one of the plurality of multicast receivers with bandwidth availability that is less than the bandwidth of the multicast stream.

Embodiments of the present invention have the advantage that the transmission rate of the multicast stream is modified, to optimize bandwidth usage in the network. Moreover, the transformation of the multicast stream is transparent. The user at the multicast receiver and the streaming source do not require any modifications on their ends, to transform the multicast stream. In addition to this, the transformation of the multicast stream can be carried out on a plurality of encoding schemes.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method comprising:
receiving a request from a receiver node in a network to receive a first multicast stream, wherein the first multicast stream has a first bandwidth and is transmitted by a multicast source in a first multicast group, and wherein the receiver is configured to receive using a second bandwidth that is different from the first bandwidth;
responsive to receiving the request, determining that the first bandwidth is different from the second bandwidth;
based on determining that the first bandwidth is different from the second bandwidth, redirecting the request to a content engine node in the network;
receiving, from the content engine node, a second multicast stream having a third bandwidth and being associated with a second multicast group, wherein the second multicast stream is a modified version of the first multicast stream, the modified version including modifying a parameter group that includes the first bandwidth, a first format of the first multicast stream and an identifying information of the first multicast stream, and wherein the second multicast stream is available in the second multicast group using the third bandwidth while the first multicast stream is available in the first multicast group using the first bandwidth;
based on receiving the second multicast stream, subscribing the receiver node as a member of the second multicast group; and
forwarding the second multicast stream to the receiver node.

2. The method of claim 1, wherein the second bandwidth is less than the first bandwidth.

3. The method of claim 2, wherein the third bandwidth is less than or same as the second bandwidth.

4. The method of claim 1, wherein the method is performed using a router connected to the receiver node.

5. The method of claim 4, wherein the router is a Web Cache Communication Protocol (WCCP) router.

6. A method comprising:
receiving a request from a router node in a network to receive a first multicast stream using a second bandwidth, wherein the first multicast stream is transmitted by a multicast source in a first multicast group using a first bandwidth;
responsive to receiving the request, joining the first multicast group;
based on joining the first multicast group, receiving the first multicast stream from the multicast source using the first bandwidth;
determining that the first bandwidth is different from the second bandwidth;
modifying the first multicast stream by modifying a parameter group that includes the first bandwidth, a first format of the first multicast stream and an identifying information associated with the first multicast stream, wherein the firs bandwidth is modified to a third bandwidth that is less than or same as the second bandwidth, and the group is modified to a second multicast group, the modification resulting in a second multicast steam that is transmitted in the second multicast group using the third bandwidth while the first multicast stream is transmitted in the first multicast group using the first bandwidth;
storing a copy of the second multicast stream in local storage; and
sending the second multicast stream to the router node.

7. The method of claim 6, wherein the second bandwidth is less than the first bandwidth.

8. The method of claim 6, wherein the third bandwidth is based on a value configured by an administrator.

9. The method of claim 6, wherein the method is performed by a content engine node that is deployed at a gateway point between a first network associated with the first bandwidth and a second network associated with the second bandwidth.

10. The method of claim 6, wherein modifying the group associated with the first multicast stream comprises changing a first Internet Protocol (IP) address associated with the first multicast group to a second IP address associated with the second multicast group, wherein the second IP address is selected from a range of unused IP addresses.

11. The method of claim 6, wherein determining that the first bandwidth is different from the second bandwidth further comprises:
examining Session Description Parameters (SDP) associated with the first multicast stream, wherein the SDP describes the content of the first multicast stream and further includes a bandwidth attribute associated with the first multicast stream; and
based on examining the SDP, determining that the first multicast stream is being transmitted with the first bandwidth.

12. The method of claim 6, wherein modifying the first multicast stream further comprises:
modifying a format of the first multicast stream by changing from a first bit rate to a second bit rate that is lower than the first bit rate, wherein the first bit rate and the second bit rate are associated with the content of the first multicast stream; and
modifying an SDP associated with the first multicast stream by including modified information in the SDP.

13. The method of claim 12, wherein the modified information included in the SDP is selected from a group including at least a new format for the first multicast stream and an address of the second multicast group.

14. The method of claim 6, wherein modifying the first multicast stream further comprises at least one of:
reducing a frames per second (FPS) rate of the first multicast stream; and
reducing a resolution of the first multicast stream.

15. The method of claim 6, further comprising:
receiving a new request from a second router node in the network to receive the first multicast stream using a new bandwidth;
determining that the new bandwidth is less than a bandwidth of the second multicast stream;
based on determining that the new bandwidth is less than or same as the bandwidth of the second multicast stream;
retrieving the copy of the second multicast stream from local storage; and
sending the second multicast stream to the second router node.

16. A system comprising:
a processor; and
instructions encoded in a non-transitory machine-readable medium for execution by the processor and operable to cause the processor to perform functions including:

receiving a request from a receiver node in a network to receive a first multicast stream, wherein the first multicast stream has a first bandwidth and is transmitted by a multicast source in a first multicast group, and wherein the receiver is configured to receive using a second bandwidth that is different from the first bandwidth;

responsive to receiving the request, determining that the first bandwidth is different from the second bandwidth;

based on determining that the first bandwidth is different from the second bandwidth, redirecting the request to a content engine node in the network;

receiving, from the content engine node, a second multicast stream having a third bandwidth and being associated with a second multicast group, wherein the second multicast stream is a modified version of the first multicast stream, the modified version including modifying a parameter group that includes the first bandwidth, a first format of the first multicast stream and an identifying information of the first multicast stream, and wherein the second multicast stream is available in the second multicast group using the third bandwidth while the first multicast stream is available in the first multicast group using the first bandwidth;

based on receiving the second multicast stream, subscribing the receiver node as a member of the second multicast group; and forwarding the second multicast stream to the receiver node.

17. A system comprising:

a processor; and instructions encoded in a non-transitory machine-readable medium for execution by the processor and operable to cause the processor to perform functions including:

receiving a request from a router node in a network to receive a first multicast stream using a second bandwidth, wherein the first multicast stream is transmitted by a multicast source in a first multicast group using a first bandwidth;

responsive to receiving the request, joining the first multicast group;

based on joining the first multicast group, receiving the first multicast stream from the multicast source using the first bandwidth;

determining that the first bandwidth is different from the second bandwidth;

modifying the first multicast stream by modifying a parameter group that includes the first bandwidth, a first format of the first multicast stream and an identifying information associated with the first multicast stream, wherein the first bandwidth is modified to a third bandwidth that is less than or same as the second bandwidth, and the group is modified to a second multicast group, the modification resulting in a second multicast steam that is transmitted in the second multicast group using the third bandwidth while the first multicast stream is transmitted in the first multicast group using the first bandwidth;

storing a copy of the second multicast stream in local storage; and sending the second multicast stream to the router node.

18. The system of claim 17, wherein determining that the first bandwidth is different from the second bandwidth further comprises:

examining Session Description Parameters (SDP) associated with the first multicast stream, wherein the SDP describes the content of the first multicast stream and further includes a bandwidth attribute associated with the first multicast stream; and based on examining the SDP, determining that the first multicast stream is being transmitted with the first bandwidth.

19. The system of claim 17, wherein modifying the first multicast stream further comprises:

modifying a format of the first multicast stream by changing from a first bit rate to a second bit rate that is lower than the first bit rate, wherein the first bit rate and the second bit rate are associated with the content of the first multicast stream; and modifying an SDP associated with the first multicast stream by including modified information in the SDP.

20. The system of claim 17, wherein the modified information included in the SDP is selected from a group including at least a new format for the first multicast stream and an address of the second multicast group.

21. A non-transitory machine-readable medium including instructions for execution by a processor, the instructions being operable to cause the processor to perform functions including:

receiving a request from a router node in a network to receive a first multicast stream using a second bandwidth, wherein the first multicast stream is transmitted by a multicast source in a first multicast group using a first bandwidth;

responsive to receiving the request, joining the first multicast group;

based on joining the first multicast group, receiving the first multicast stream from the multicast source using the first bandwidth;

determining that the first bandwidth is different from the second bandwidth;

modifying the first multicast stream by modifying a parameter group that includes the first bandwidth, a first format of the first multicast stream and an identifying information associated with the first multicast stream, wherein the first bandwidth is modified to a third bandwidth that is less than or same as the second bandwidth, and the group is modified to a second multicast group, the modification resulting in a second multicast steam that is transmitted in the second multicast group using the third bandwidth while the first multicast stream is transmitted in the first multicast group using the first bandwidth;

storing a copy of the second multicast stream in local storage; and sending the second multicast stream to the router node.

* * * * *